United States Patent
Yu et al.

(10) Patent No.: US 10,622,663 B2
(45) Date of Patent: Apr. 14, 2020

(54) CARTRIDGE FOR SECONDARY BATTERY AND SECONDARY BATTERY PACK COMPRISING SAME

(71) Applicant: LG CHEM, LTD., Seoul (KR)

(72) Inventors: Sung-Chun Yu, Daejeon (KR); Tae-Young Kang, Daejeon (KR); Yong-Joon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 106 days.

(21) Appl. No.: 15/743,759

(22) PCT Filed: Feb. 9, 2017

(86) PCT No.: PCT/KR2017/001423
§ 371 (c)(1),
(2) Date: Jan. 11, 2018

(87) PCT Pub. No.: WO2017/138753
PCT Pub. Date: Aug. 17, 2017

(65) Prior Publication Data
US 2018/0358646 A1    Dec. 13, 2018

(30) Foreign Application Priority Data

Feb. 12, 2016 (KR) .......................... 10-2016-0016538

(51) Int. Cl.
*H01M 2/10* (2006.01)
*H01M 2/04* (2006.01)
(Continued)

(52) U.S. Cl.
CPC ..... *H01M 10/0413* (2013.01); *H01M 2/1016* (2013.01); *H01M 2/1077* (2013.01);
(Continued)

(58) Field of Classification Search
CPC ............ H01M 2/02; H01M 2/10; H01M 2/12; H01M 10/04; H01M 10/613
See application file for complete search history.

(56) References Cited

U.S. PATENT DOCUMENTS

2007/0216371 A1    9/2007  Yoon et al.
2009/0258288 A1*   10/2009 Weber ..................... H01M 2/10
                                                        429/120
(Continued)

FOREIGN PATENT DOCUMENTS

KR    10-2007-0035640 A    4/2007
KR    10-2014-0144787 A    12/2014
(Continued)

OTHER PUBLICATIONS

International Search Report, issued in PCT/KR2017/001423, dated May 31, 2017.

*Primary Examiner* — Kenneth J Douyette
(74) *Attorney, Agent, or Firm* — Birch, Stewart, Kolasch & Birch, LLP

(57) ABSTRACT

A cartridge for a secondary battery includes a cooling channel in which an upper cooling plate and a lower cooling plate are respectively coupled to an upper rim and a lower rim of a ring-shaped main frame having a hollow central area to face each other, the cooling channel being formed in a space between the upper cooling plate and the lower cooling plate, and the main frame includes an opening configured to form an inlet and an outlet of the cooling channel by passing through the main frame in a lateral direction, the opening having an edge area chamfered such that a diameter thereof expands in an outward direction.

13 Claims, 10 Drawing Sheets

(51) Int. Cl.
*H01M 10/04* (2006.01)
*H01M 10/0525* (2010.01)
*H01M 10/6557* (2014.01)
*H01M 10/6566* (2014.01)
*H01M 10/6563* (2014.01)
*H01M 10/625* (2014.01)
*H01M 10/647* (2014.01)
*H01M 10/623* (2014.01)
*H01M 10/613* (2014.01)

(52) U.S. Cl.
CPC ..... *H01M 2/1083* (2013.01); *H01M 10/0436* (2013.01); *H01M 10/0486* (2013.01); *H01M 10/613* (2015.04); *H01M 10/623* (2015.04); *H01M 10/625* (2015.04); *H01M 10/647* (2015.04); *H01M 10/6557* (2015.04); *H01M 10/6563* (2015.04); *H01M 10/6566* (2015.04)

(56) References Cited

U.S. PATENT DOCUMENTS

| | | | |
|---|---|---|---|
| 2015/0140366 A1* | 5/2015 | Nicholls | H01M 10/5016 429/50 |
| 2016/0149277 A1 | 5/2016 | Kim et al. | |
| 2016/0204398 A1 | 7/2016 | Moon et al. | |
| 2016/0248135 A1 | 8/2016 | Kim et al. | |
| 2017/0033419 A1 | 2/2017 | Eom et al. | |

FOREIGN PATENT DOCUMENTS

| | | |
|---|---|---|
| KR | 10-2015-0025241 A | 3/2015 |
| KR | 10-2015-0050358 A | 5/2015 |
| KR | 10-2015-0118375 A | 10/2015 |
| KR | 10-2015-0140121 A | 12/2015 |

* cited by examiner

CARTRIDGE FOR SECONDARY BATTERY AND SECONDARY BATTERY PACK COMPRISING SAME

TECHNICAL FIELD

The present disclosure relates to a cartridge for a secondary battery, and more particularly, to a cartridge used for receiving, stacking, and cooling a secondary battery when configuring a secondary battery pack including a plurality of secondary batteries, and a secondary battery pack including the cartridge.

The present application claims priority to Korean Patent Application No. 10-2016-0016538 filed on Feb. 12, 2016 in the Republic of Korea, the disclosure of which is incorporated herein by reference.

BACKGROUND ART

Recently, secondary batteries are widely used for not only small-scale apparatuses such as portable electronic apparatuses but also medium and large-scale apparatuses such as automobiles or power storage apparatuses. Particularly, as carbon energy is gradually exhausted and an interest on an environment increases, hybrid automobiles and electric automobiles are drawing public attention all over the world including the United States, Europe, Japan, and South Korea.

Most essential part in the hybrid automobiles or electric automobiles is a secondary battery pack giving driving force to a motor of automobiles. Since the hybrid automobiles or electric automobiles may obtain driving force of the automobiles through charging/discharging of the secondary battery pack, the hybrid automobiles or electric automobiles have lots of advantages in various aspects such as excellent gas mileage, and non-exhaustion or reduction of polluted materials compared to automobiles which use an engine only, so users of the hybrid automobiles or electric automobiles increase gradually.

In a secondary battery pack applied to an electric automobile, lots of secondary batteries are electrically connected in order to increase a capacity and power thereof. In this case, for a unit secondary battery, a pouch type-secondary battery which may be easily stacked and allow space-intensive arrangement is widely used.

However, since a pouch type-secondary battery is packed with a battery case of a laminated sheet including aluminum and a polymer resin in general, mechanical strength thereof is not large. Therefore, when configuring a secondary battery pack including a plurality of pouch type-secondary batteries, a cartridge is generally used in order to protect the secondary batteries from an external impact, etc., prevent moving thereof, and facilitate stacking. The cartridge may be replaced with various other terms such as a frame for stacking. Also, a plurality of cartridges are used in a stacked form to configure a secondary battery pack, and the secondary batteries may be arranged in an inner empty space generated when the cartridges are stacked.

Meanwhile, in the case of assembling a plurality of secondary batteries by using a plurality of cartridges, a plate-shaped cooling fin, that is, a cooling plate may be interposed between the secondary batteries. A secondary battery may be used under a high-temperature environment such as summer and also the secondary battery itself may emit heat. In this case, in the case where a plurality of secondary batteries are mutually stacked, the temperature of the secondary battery may be raised even more. When the temperature is higher than an appropriate temperature, the performance of the secondary battery may deteriorate, and in a serious case, there is a danger of explosion or ignition. Therefore, a configuration of interposing a cooling plate between secondary batteries when configuring a secondary battery pack, and preventing a temperature rise of the secondary battery through the cooling plate may be used.

In the secondary battery pack in which the cooling plate is interposed between the secondary batteries, the secondary battery may be cooled down in various forms and methods. As a representative method among cooling methods, air cooling of lowering the temperature of a secondary battery through heat exchange between a cooling plate and air by allowing external air to flow around the cooling plate is widely used. The secondary battery which cools down the secondary battery through air cooling allows air to flow in and out between the inside and outside of the secondary battery pack by securing a cooling channel around the cooling plate and connecting the cooling channel to a duct.

Meanwhile, in an air-cooled structure of a conventional secondary battery pack, a plurality of cooling channels are provided along a cartridge stacking direction and a duct is arranged across the cooling channels in general. In this case, separation of air occurs at the end of the cooling channel where an air channel drastically changes and so turbulence occurs. This turbulence hinders an air flow inside the secondary battery pack. When an air flow inside the secondary battery pack becomes bad, a cooling performance of the secondary battery may deteriorate, and an energy efficiency of an apparatus forcibly flowing air, for example, a cooler such as a ventilation fan is reduced.

DISCLOSURE

Technical Problem

The present disclosure is designed to solve the problems of the related art, and therefore the present disclosure is directed to providing a cartridge for a secondary battery, including a cooling channel which may smoothly induce an air flow inside a secondary battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cartridge for a secondary battery, the cartridge including a cooling channel in which an upper cooling plate and a lower cooling plate are respectively coupled to an upper rim and a lower rim of a ring-shaped main frame having a hollow central area to face each other, the cooling channel being formed in a space between the upper cooling plate and the lower cooling plate, wherein the main frame includes an opening configured to form an inlet and an outlet of the cooling channel by passing through the main frame in a lateral direction, the opening having an edge area chamfered such that a diameter thereof expands in an outward direction.

The opening may include a first section having a diameter corresponding to the cooling channel and a second section having a diameter gradually increasing from an end point of the first section.

The opening may further include a third section having a diameter discontinuously increasing from an end point of the second section.

A diameter of an end point of the third section may be equal to or greater than a diameter of the second section when the second section is further extended to the end point of the third section.

The main frame may include four unit frames forming a rectangular structure, and the opening may be formed in a pair of unit frames corresponding to a long side of the main frame.

The cartridge for the secondary battery may further include: a spacer member including one end and an opposite end, the one end being fixed to an opening of one of the pair of unit frames, the opposite end being fixed to an opening of the other, the spacer member crossing a central area of the main frame.

The cartridge for the secondary battery may further include a coupling protrusion protruding on or under the main frame in a vertical direction, and a coupling groove recessed in an opposite side to a side to which the coupling protrusion is provided.

In another aspect of the present disclosure, there is also provided a secondary battery pack including: a cell assembly in which the cartridges for the secondary battery respectively receive secondary batteries and are arranged in a layered form; a duct unit including a cover mounted on the cell assembly and configured to form an air flow space and cover at least one of an entry and an exit of the cooling channels, and an air inlet/outlet provided to an upper end of the cover; and a pack case configured to receive the cell assembly and the duct unit as one body, and including a ventilation hole configured to communicate with the air outlet.

The duct unit may include an inlet duct and an outlet duct configured to respectively cover the entry and the exit of the cooling channels.

The secondary battery pack may further include: a fan provided to the cover of the outlet duct such that air flows through the cooling channels.

The cover may be configured such that the air flow space is reduced from an upper end thereof to a lower end thereof.

In another aspect of the present disclosure, there is also provided an automobile including the secondary battery pack.

Advantageous Effects

According to one aspect of the present disclosure, a cartridge for a secondary battery may be provided in which an air separation phenomenon is reduced at an entry/exit portion of cooling channels and an air flow may be improved when an air-cooled secondary battery pack is configured.

According to another aspect of the present disclosure, a secondary battery pack is provided, the secondary battery pack including the cartridges for the secondary batteries, having an excellent cooling performance, and implementing a compact air-cooled structure.

According to another aspect of the present disclosure, the cooling channel for cooling the secondary battery pack is completely separated from an exhaust path of a gas generated by venting due to an increase of an inner pressure of the secondary battery. Particularly, in the case where the secondary battery pack according to the present disclosure is used as a secondary battery pack for an automobile, the cooling channel may be connected to an air conditioning system. In this case, a possibility that an exhaust gas due to venting of the secondary battery flows into the air conditioning system and a driver of the automobile is exposed to the exhaust gas, may be blocked out.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Also, in the case where specific descriptions of a related known configuration or function in describing the present disclosure may obscure the scope of the present disclosure, detailed descriptions thereof may be omitted.

A cartridge for a secondary battery according to an embodiment of the present disclosure is used when configuring a secondary battery pack by stacking and packaging a plurality of secondary batteries, prevents movement of a secondary battery by holding the secondary battery, and guides assembling of the secondary battery.

Figure 1:
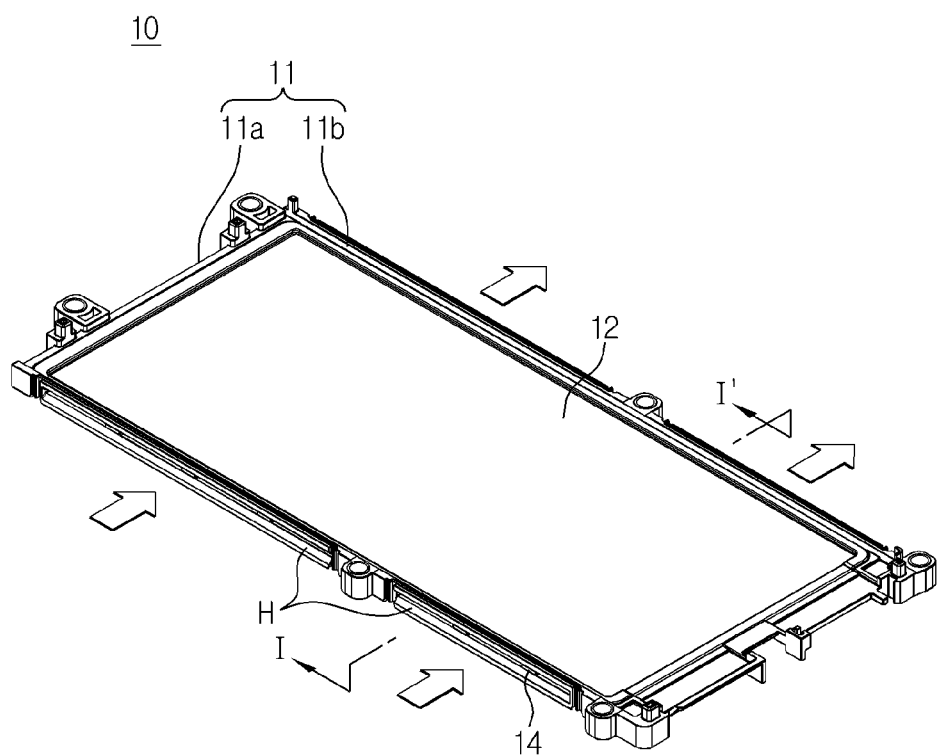
FIG. 1 is a perspective view of a cartridge for a secondary battery according to an embodiment of the present disclosure.
Figure 2:
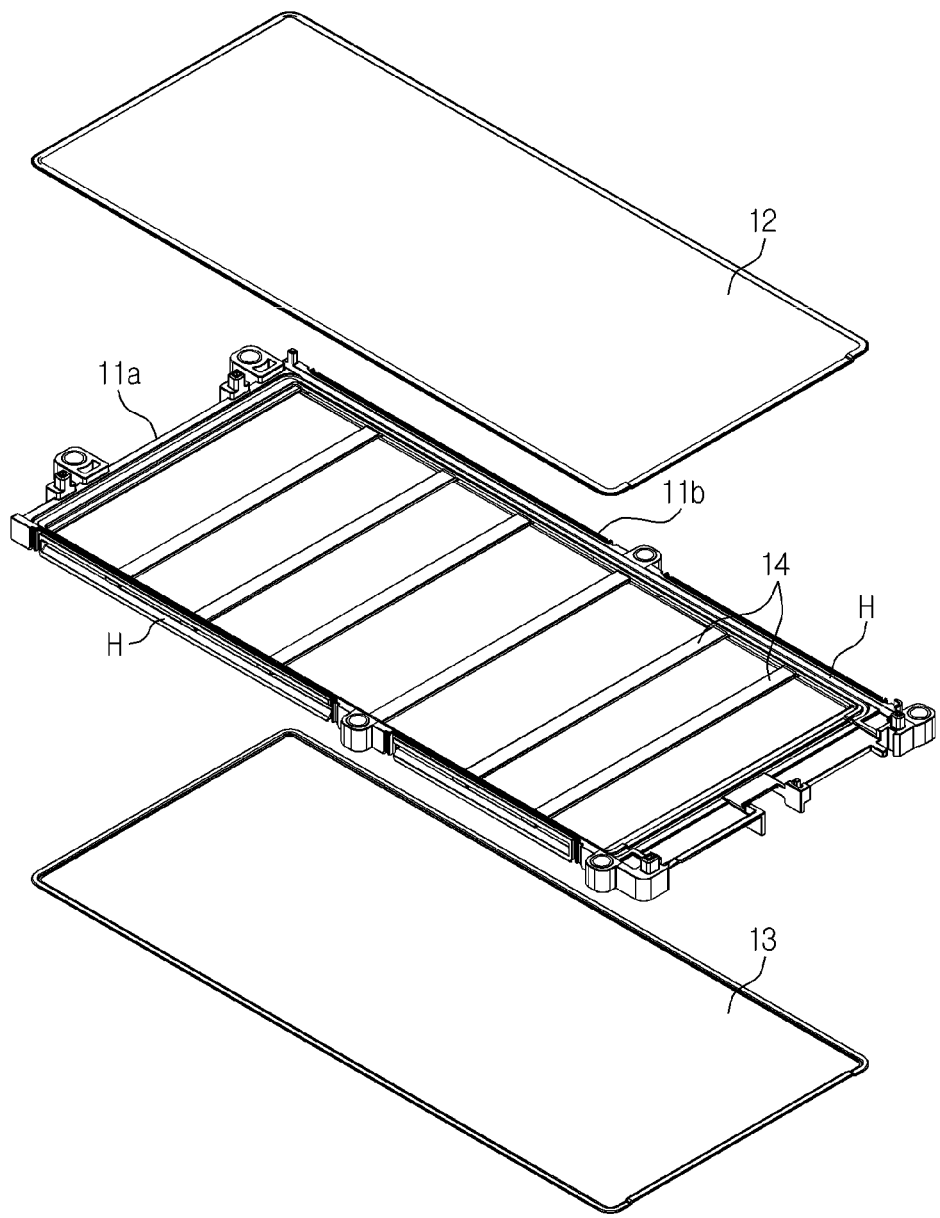
FIG. 2 is an exploded perspective view of FIG. 1.
Figure 3:
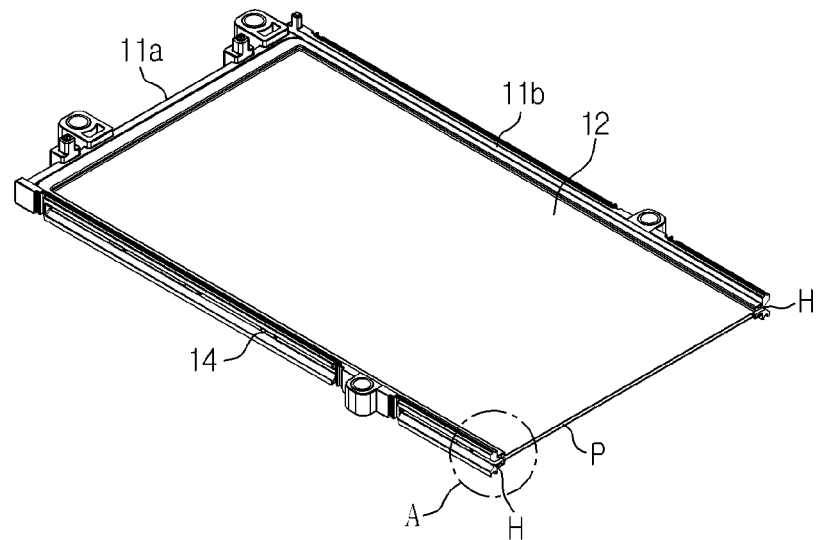
FIG. 3 is a cut perspective view of the cartridge for the secondary battery of FIG. 1 taken along a line I-I'.

FIG. 1 is a perspective view of a cartridge for a secondary battery according to an embodiment of the present disclosure, FIG. 2 is an exploded perspective view of FIG. 1, and FIG. 3 is a cut perspective view of the cartridge for the secondary battery of FIG. 1 taken along a line I-I'.

Referring to FIGS. 1 to 3, a cartridge 10 for a secondary battery according to an embodiment of the present disclosure includes a main frame 11, an upper cooling plate 12, a lower cooling plate 13, and a cooling channel P formed by assembling them.

The main frame 11 includes four unit frames 11a and 11b. Each unit frame may be implemented in a form in which two opposite ends thereof are connected to each other such that a central area is empty. For example, the main frame 11 may include a pair of unit frames 11b corresponding to a long side, and a pair of unit frames 11a corresponding to a short side, and so may have an approximately quadrangular ring shape when viewed from above. Here, though the four unit frames may be formed as one body when manufactured, the four unit frames may be separately manufactured and then mutually assembled during a manufacturing process of the cartridge 10.

Particularly, the main frame 11 includes an opening H passing through the pair of unit frames 11b corresponding to the long side in a horizontal direction or a lateral direction. Therefore, cooling fluid such as air may pass through the unit frame 11b and flow in a horizontal direction through the opening H. Though described below in detail, the opening H may serve as an entry and an exit of the cooling channel P.

The upper cooling plate 12 may be formed in a plate shape and arranged in a laid-down form such that wide surfaces thereof face upward and downward. Particularly, the upper cooling plate 12 may be formed in a quadrangular plate. Also, a rim of the upper cooling plate 12 may be arranged on an upper rim of the main frame 11.

Like the upper cooling plate 12, the lower cooling plate 13 may be formed in a plate shape and arranged to face the upper cooling plate 12 in a laid-down form such that wide surfaces thereof face upward and downward. Also, the lower cooling plate 13 may be formed in a quadrangular plate, and a rim thereof may be arranged on a lower rim of the main frame 11. Also, the lower cooling plate 13 may be spaced apart from the upper cooling plate 12 by a preset distance to form the cooling channel P between the upper cooling plate 12 and the lower cooling plate 13.

More specifically, as illustrated in FIGS. 2 and 3, the upper cooling plate 12 and the lower cooling plate 13 are bonded to the main frame 11 with an adhesive G (see FIG. 5) such that rim portions thereof are respectively arranged on an upper end rim and a lower end rim of the main frame 11, or may be insert-injection molded together with the main frame 11 at an initial stage of a manufacturing process of the cartridge 10. Also, wide surfaces inside the rims of the upper cooling plate 12 and the lower cooling plate 13 cover a central area of the main frame 11 and so form the cooling channel P therebetween. In this case, the opening H provided to two unit frames facing each other, that is, the pair of unit frames corresponding to the long side in the present embodiment serve as an entry and an exit of the cooling channel P. With this configuration, as indicated by arrows of FIG. 1, air (cooling fluid) may flow into the cooling channel P through an opening H in one side of the main frame 11, and may be discharged to the outside of the cooling channel P through an opening H in an opposite side.

According to the cartridge configuration including the cooling channel P, when a plurality of cartridges are stacked such that secondary batteries are arranged on and under one cartridge, the upper cooling plate 12 and the lower cooling plate 13 may exchange heat with secondary batteries 20 arranged on and under the upper cooling plate 12 and the lower cooling plate 13, and may be cooled down by external air supplied to the cooling channel P.

Particularly, the upper cooling plate 12 and the lower cooling plate 13 may include aluminum having excellent thermal conductivity and which is lightweight and is easily formed. However, the present disclosure is not limited to this cooling plate material, and the cooling plate may include various materials such as other metals besides aluminum.

Also, as illustrated in FIG. 2, the main frame 11 according to the present embodiment may further include a plurality of spacer members 14 arranged inside the cooling channel P.

The spacer member 14 may be a bar having a preset thickness and may be arranged such that one end thereof is fixed to an opening H in one side, and an opposite end thereof is fixed to an opening H in an opposite side.

The spacer member 14 allows the upper cooling plate 12 and the lower cooling plate 13 to maintain an initial spaced state. That is, the spacer member 14 may secure stability in a shape of the cooling channel P by preventing twisting or deformation of the upper cooling plate 12 and the lower cooling plate 13.

Hereinafter, a structure of the opening H formed in the main frame 11 according to the present disclosure is described in more detail.

Figure 4:
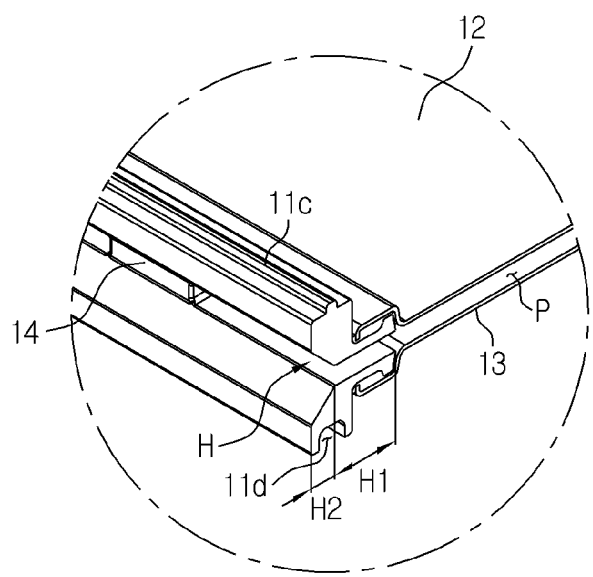
FIG. 4 is an enlarged perspective view of an area A of FIG. 3.
Figure 5:
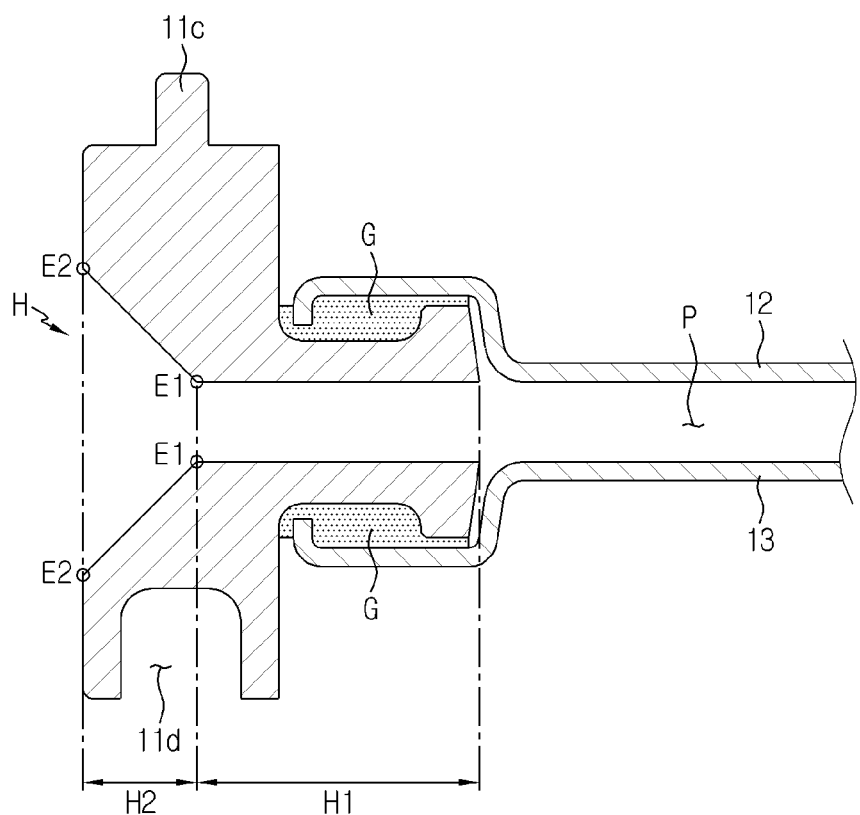
FIG. 5 is a cross-sectional view of FIG. 4.

FIG. 4 is an enlarged perspective view of an area A of FIG. 3, and FIG. 5 is a cross-sectional view of FIG. 4.

Referring to FIGS. 4 and 5, according to the present embodiment, the opening H of the main frame 11 may be provided in a form in which an edge area thereof is chamfered such that a diameter increases toward an outward direction.

More specifically, the opening H may include a first section H1 having a diameter corresponding to an inner diameter of the cooling channel P, and a second section H2 having a diameter gradually increasing from an end point E1 of the first section H1.

In the opening H, the first section H1 is a section directly connected to the inside of the cooling channel P formed by the upper and lower cooling plates 12 and 13, and the second section H2 is a section having a diameter greater than that of the first section H1 and may be a section at which inflow or an outflow of air in an inner or outer direction of the main frame 11 starts.

According to the configuration of the opening H, flow of external air at an entry side of the cooling channel P may be smoother due to the second section H2 which is relatively wider than the first section H1. That is, since the second section H2 expands vertically from an end point of the first section H1, for example, according to the present embodiment, compared with a case where only the first section H1 is present, a vertical range to which air may be introduced is wide and so air flow per unit hour may increase. Also, the external air introduced to the second section H2 may converge to the first section H1 in high speed and flow into the cooling channel P.

Also, flow of external air at an exit side of the cooling channel P may be smooth. For example, the cooling channel P provided to the cartridge 10 for the secondary battery may vertically communicate with a duct unit 200 (see FIG. 10) outside the cartridge 10, and in the case where only the first section H1 is present, since an air channel drastically changes outside the exit of the cooling channel P, an air separation phenomenon occurs at an end of the opening H and turbulence may be formed. Such turbulence may be a factor hindering air flow.

However, according to the present embodiment, since a diameter of the second section H2 gradually increases at an end point of the first section H1, the air separation phenomenon at the end of the opening H may be reduced. That is, when air is discharged to the outside from the inside of the cooling channel P, since the air flows along an inclined surface of the second section H2, the air flow may be induced in an upward or downward direction by a preset angle. Therefore, since an amount of air separated from the end of the opening H is reduced and turbulence is less formed at the exit side of the cooling channel P, the air flow may become smooth.

Figure 6:
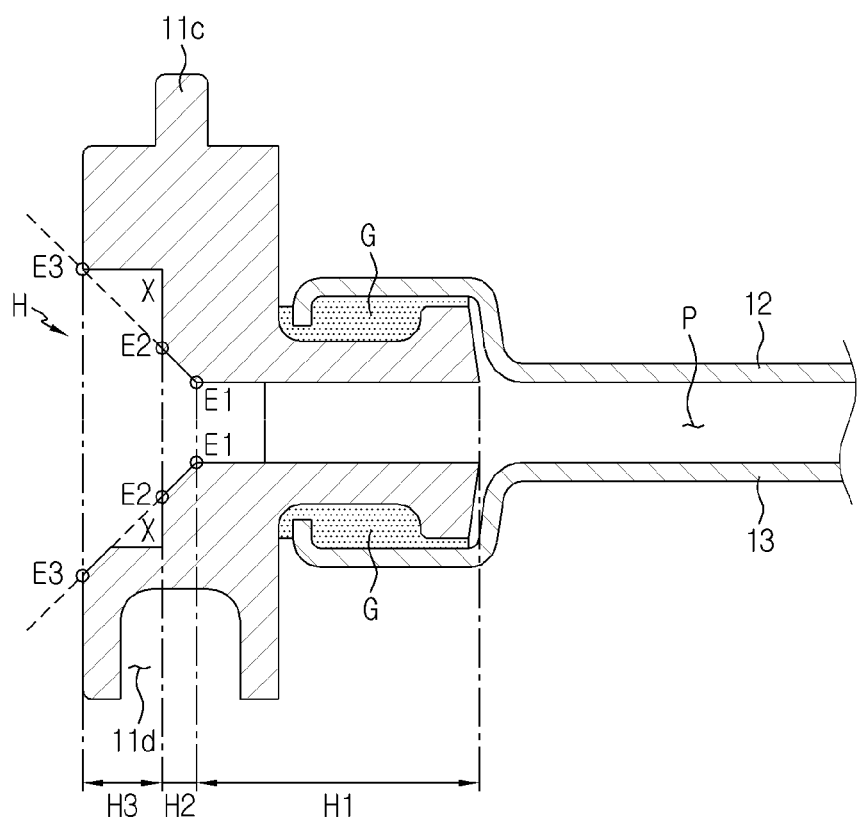
FIG. 6 is a cross-sectional view of a modification of FIG. 5.

FIG. 6 is a cross-sectional view of a modification of FIG. 5.

FIG. 6 is a modification of FIG. 5, and an opening H of the present modification may further include a third section H3 having a diameter discontinuously increasing from an end point E2 of the second section H2.

In this case, a diameter of the end point E3 of the third section H3 may be equal to or greater than a diameter of the second section H2 when the second section H2 is virtually extended to the end point E3 of the third section H3.

As illustrated in FIG. 6, the third section H3 according to the present modification is a section in which an area marked by X is further chamfered in the embodiment of FIG. 5. An air flow space corresponding to the area marked by X may be further provided to the third section H3 than the embodiment of FIG. 5. According to the present modification, an effect of the above-described embodiment may be pursued by providing the second section H2 between the first section H1 and the third section H3, and also an inflow/outflow amount of air may be increased even further through the third section H3. That is, since the third section H3 is an outermost portion of the opening H and an air incident angle and an air flow space may be further secured in the third section H3 than the embodiment of FIG. 5, a greater amount of air per unit hour may flow into and out from the cooling channel P.

The main frame 11 according to the present embodiment may further include a coupling protrusion 11c vertically protruding on or under the main frame 11, and a coupling groove 11d recessed in an opposite side to the side to which the coupling protrusion 11c is provided.

Particularly, the coupling protrusion 11c and the coupling groove 11d may be provided to the pair of unit frames 11b including the opening H.

For example, (see FIGS. 10 and 11) in the case where the coupling protrusion 11c is arranged on the main frame 11, and the coupling groove 11d is formed under the main frame 11, when the cartridges 10 are stacked, the main frames 11 are mutually stacked and the coupling protrusion 11c of the cartridge 10 stacked below may be inserted to the coupling groove 11d of the cartridge 10 stacked above. Meanwhile, referring to FIG. 11 together with FIGS. 5 and 6, a sealing member (not shown) having elasticity may be arranged or the adhesive G may be applied to a gap between the coupling protrusion 11c and the coupling groove 11d to completely seal a fastening portion of the coupling protrusion 11c and the coupling groove 11d. According to this configuration of the present disclosure, flowing of fluid to/from the relevant portion may be prevented by sealing the coupling portion between adjacent cartridges 10.

Figure 11:
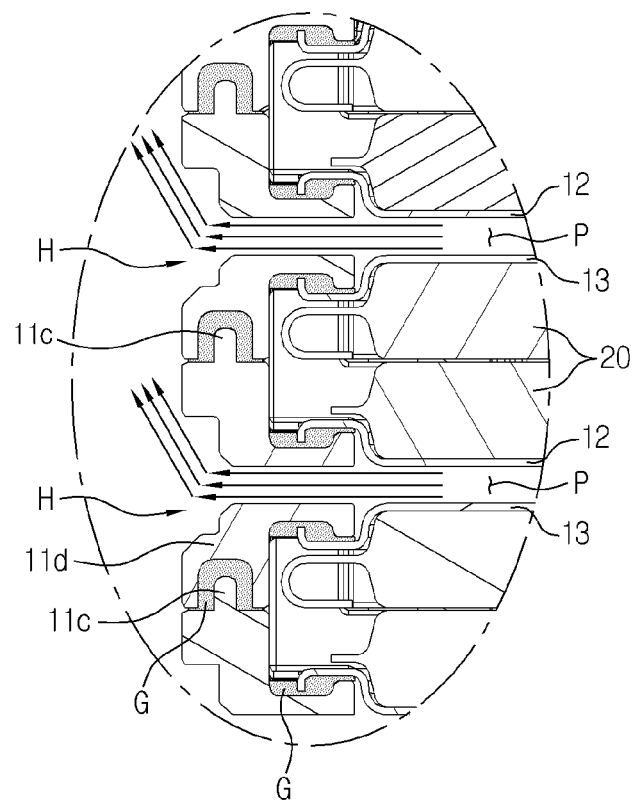
FIG. 11 is an enlarged view of an area B of FIG. 10.

That is, this configuration of the present disclosure may increase cooling efficiency of the battery pack by preventing a phenomenon that cooling fluid moving in an arrow direction illustrated in FIG. 11 is introduced toward the secondary battery 20 through the gap between the coupling protrusion 11c and the coupling groove 11d.

Also, in the case where venting occurs due to an increase in an inner pressure of the secondary battery 20 and a gas leaks from the inside of the secondary battery 20, this configuration of the present disclosure may prevent a phenomenon that the gas due to venting mixes with cooling fluid flowing through the cooling channel P by isolating an inner space of the cartridge 10 in which the secondary battery 20 is arranged and the gas may stay from the cooling channel P and an inner space of a cover 211 (see FIG. 10) described below.

To completely remove a possibility that the cooling fluid is mixed with a venting gas, it is preferable that the adhesive G fills a space between the cooling plates 12 and 13 and the main frame 11 according to the present disclosure.

In the case where coupling between the main frame 11 and the cooling plates 12 and 13 is performed by the adhesive G and coupling between adjacent cartridges 10 is also performed by the adhesive G, and so an inner space of the cartridge 10 is completely isolated from an outer space in configuring the cartridge 10 according to the present disclosure, a gas generated by venting of the secondary battery 20 cannot be mixed with cooling fluid flowing through the cooling channel P.

Figure 7:
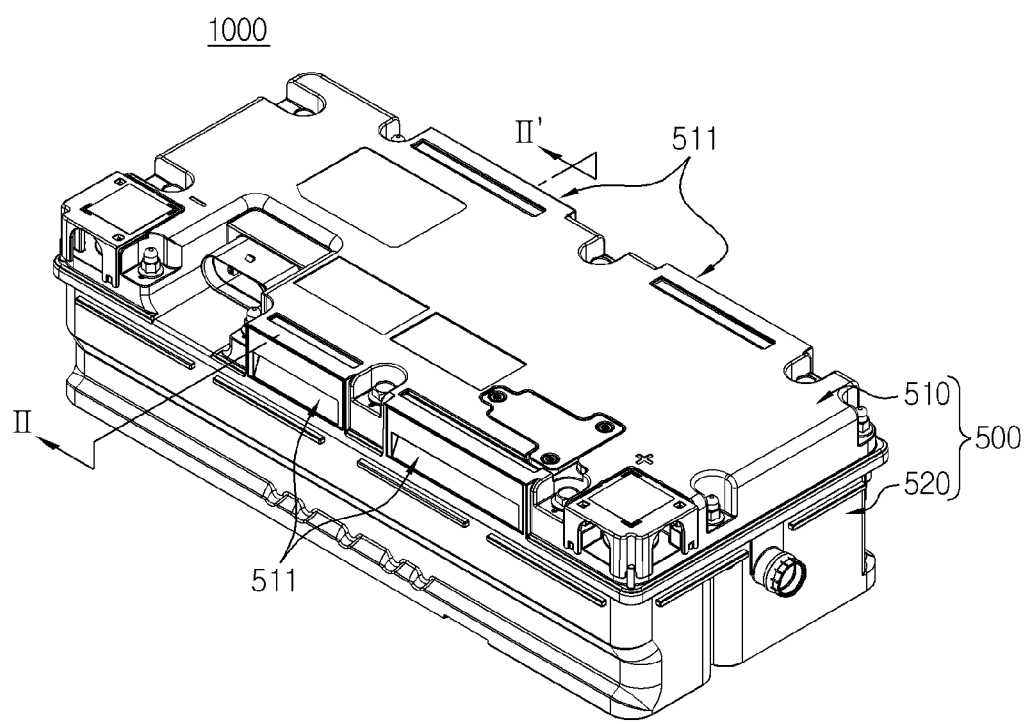
FIG. 7 is a perspective view of a secondary battery pack according to an embodiment of the present disclosure.
Figure 8:
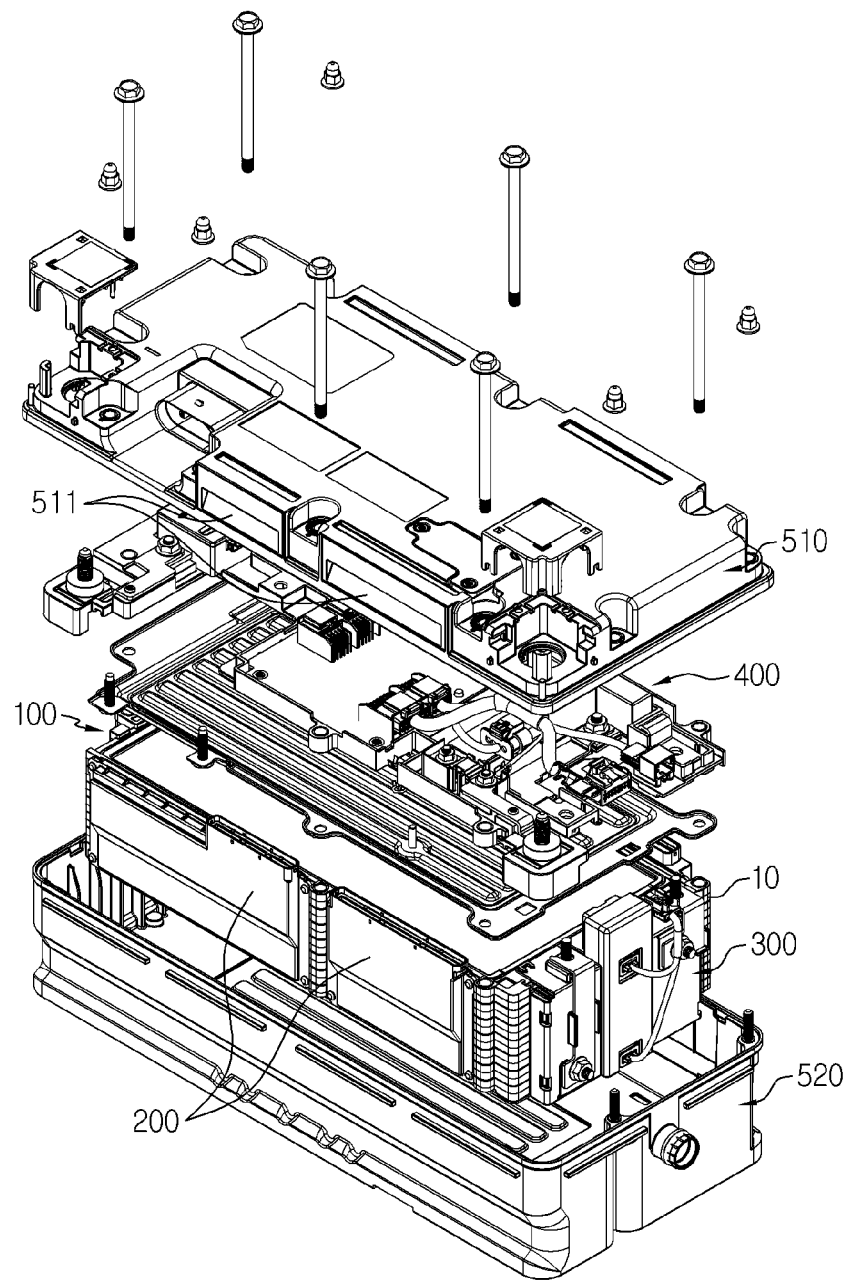
FIG. 8 is a partial exploded perspective view of FIG. 7.
Figure 9:
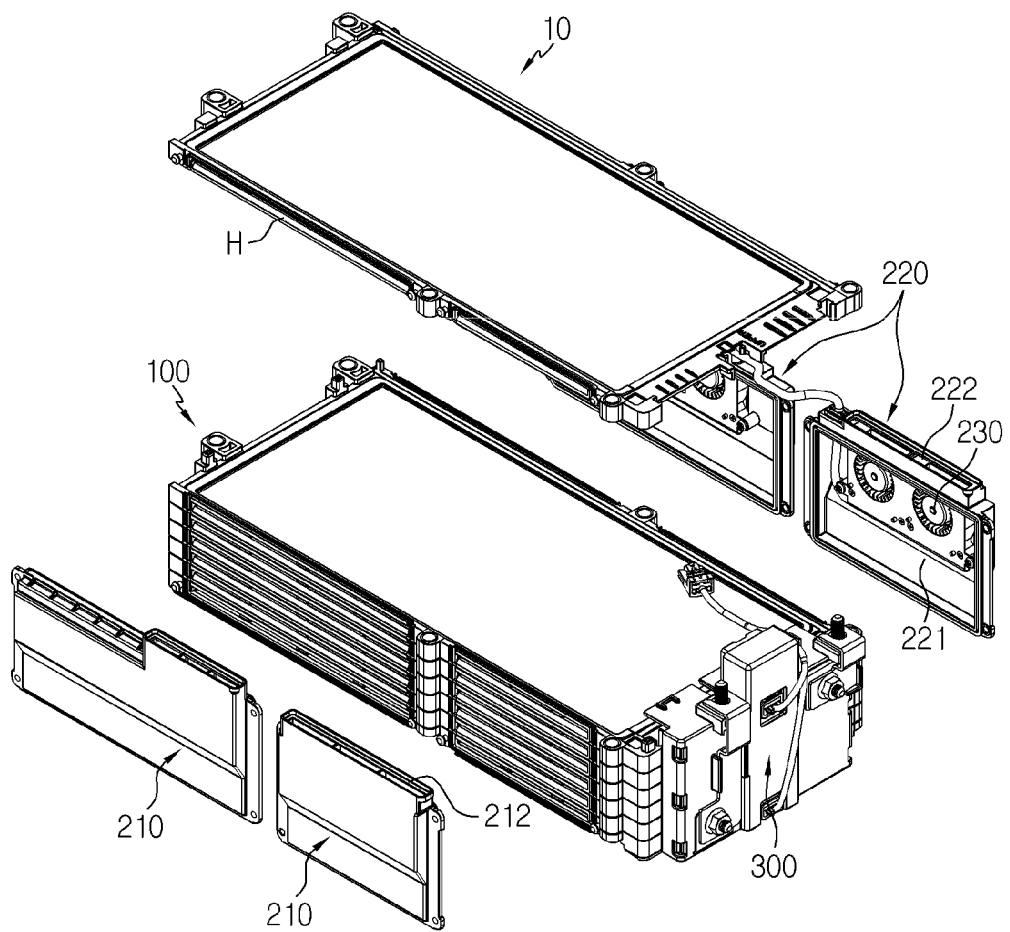
FIG. 9 is a partial exploded perspective view of configurations of a cell assembly, a duct unit, and a sensor of FIG. 8.
Figure 10:
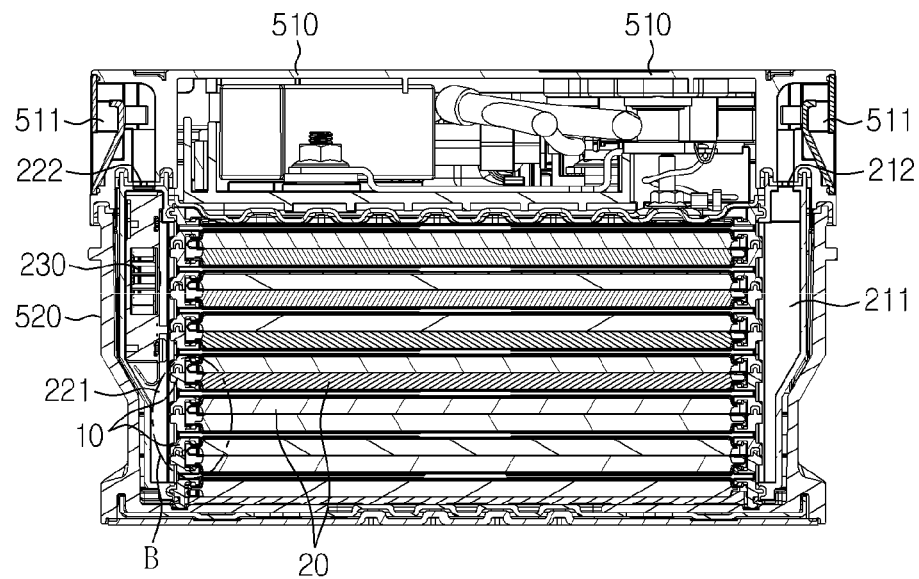
FIG. 10 is a cross-sectional view of a secondary battery pack taken along a line II-II' of FIG. 7.

FIG. 7 is a perspective view of a secondary battery pack according to an embodiment of the present disclosure, FIG. 8 is a partial exploded perspective view of FIG. 7, FIG. 9 is a partial exploded perspective view of configurations of a cell assembly 100, a duct unit 200, and a sensor 300 of FIG. 8, FIG. 10 is a cross-sectional view of a secondary battery pack taken along a line of FIG. 7, and FIG. 11 is an enlarged view of an area B of FIG. 10.

A secondary battery pack 1000 is described with reference to FIGS. 7 to 11. The secondary battery pack 1000 may include the cell assembly 100, the duct unit 200, the sensor 300, an electronic part 400, and a pack case 500 configured to receive these elements.

First, the cell assembly 100 may include one or more secondary batteries 20 and a plurality of cartridges 10.

Here, the secondary batteries 20 may be pouch type-secondary batteries. In this case, the pouch type-secondary batteries 20 may be configured in a stacked form in one direction, for example, a vertical direction.

The cell assembly 100 may be configured in a form in which the plurality of cartridges 10 are stacked in a vertical direction and one or more secondary batteries 20 are received in an inner space of the stacked cartridges 10.

As illustrated in FIGS. 8 and 9, the duct unit 200 may be mounted on the cell assembly 100 such that the duct unit 200 is arranged on one side and an opposite side of the cell assembly 100 and covers the one side and the opposite side of the cell assembly 100. More specifically, the duct unit 200 includes covers 211 and 221 and air inlet/outlet 212 and 222, and is mounted on the cell assembly 100 such that the covers 211 and 221 cover an entry and an exit of the cooling channels P of the stacked cartridges 10. According to the present embodiment, the duct unit 200 includes an inlet duct 210 and an outlet duct 220 respectively covering the entry and the exit of the cooling channel P. The inlet duct 210 serves as a space and a path of introducing external air to the cooling channels P, and discharging air which has passed through the cooling channels P to the outside.

The air inlet/outlet 212 and 222 of the duct unit 200 may be provided to upper ends of the covers 211 and 221, and the covers 211 and 221 of the duct unit 200 may be provided such that an air flow space is reduced from an upper end thereof to a lower end thereof.

As illustrated in FIG. 10, external air introduced through the air inlet/outlet 212 of the inlet duct 210 may flow from an upper portion thereof to a lower portion thereof and flow in the cooling channels P, and air coming from the cooling channels P may flow from the lower portion to the upper portion again and be discharged to the outside through the air inlet/outlet 222 of the outlet duct 220. In this case, according to the present embodiment, flux of the external air supplied to the cooling channels P may be uniform. For example, air flux supplied to a cooling channel P away from the air inlet/outlet among the cooling channels P may be relatively small. However, like the present embodiment, when the width of an air flow space is reduced from the upper end to the lower end, since the velocity of moving fluid increases toward the lower end, air flux supplied to the cooling channels P arranged in the lower portion per unit hour may become similar to air flux supplied to the cooling channels P arranged in the upper portion.

Also, a fan 230 flowing air such that the air flows fast in/out to/from the cooling channel P may be further provided to the cover 221 of the outlet duct 220. The fan 230 may be provided to at least one of the inlet duct 210 and the outlet duct 220.

Meanwhile, when the secondary battery pack 1000 is configured by using the cartridge 10 according to the present disclosure, referring to FIGS. 10 and 11, an air channel by the cooling channels P and the outlet duct 220 may be configured from a horizontal direction to a vertical direction. In this case, as described above, since the exit of the cooling channel P, that is, the opening H of the cartridge 10 has a chamfered edge area, air flow may be smoothly induced in an upward direction through the chamfered portion, for example, the second section H2 or the third section H3 of the opening H. Therefore, air separation phenomenon is reduced and turbulence formation may be suppressed at the exit side of the cooling channels P.

The sensor 300 transmits sensing information regarding an electric characteristic such as a voltage of the secondary battery 20 to an apparatus such as a battery management system (BMS). The BMS may control the secondary batteries 20 based on voltage information transmitted from the sensor 300. The sensor 300 may be mounted on the cell assembly 100 such that the sensor 300 is electrically connected to electrode leads of the secondary batteries 20.

The electronic parts 400 may include at least one of a BMS, a current sensor, a relay, and a fuse. Here, the BMS is a secondary battery management apparatus configured to generally control a charging/discharging operation of the secondary battery pack 1000. The BMS is an element generally included in the secondary battery pack 1000. Also, the current sensor is an element configured to sense a charging/discharging current of the secondary battery pack 1000, and the relay is a switching part configured to selectively open/close a charging/discharging path through which a charging/discharging current of the secondary battery pack 1000 flows. The fuse is an element provided on the charging/discharging path of the secondary battery pack 1000 and configured to cut off flow of a charging/discharging current when an abnormal circumstance of the secondary battery pack 1000 occurs. The current sensor, the relay, and the fuse may give and take information to and from the BMS and may be controlled by the BMS. The electronic parts 400 may be arranged on the cell assembly 100.

The pack case 500 includes an empty space therein and may receive the cell assembly 100, the duct unit 200, the sensor 300, and the electronic parts 400 as one body in the inner space. Since the pack case 500 may serve as an exterior material in the secondary battery pack 1000, the pack case 500 may provide structural stability to the secondary battery pack 1000 and protect the elements received inside the pack case 500 such as the cell assembly 100 from other external physical factors such as an impact or foreign substances.

Referring to FIGS. 7 and 8 again, the pack case 500 may include a lower case 520 and an upper case 510. Here, the lower case 520 may be formed in a form in which an upper portion thereof is open and a receiving space is provided, and the upper case 510 may be formed in a form covering the open upper portion of the lower case 520. Also, the lower case 520 and the upper case 510 may be coupled to each other by fastening rim portions thereof with a fastening member such as a bolt.

A ventilation hole 511 configured to communicate with the air inlet/outlet 212 and 222 of the duct unit 200 is provided in the pack case 500, particularly, the upper case 510. For example, as illustrated in FIG. 8, a plurality of ventilation holes 511 may be provided such that the ventilation holes one-to-one correspond to the air inlets/outlets 212/222 of the duct unit 200.

According to this configuration, the elements including the small fan 230, the duct unit 200, and the cell assembly 100 may be space-intensively received inside the pack case 500, and external air entry and exit paths may be simplified, and so the compact air-cooled secondary battery pack 1000 may be implemented.

Figure 12:
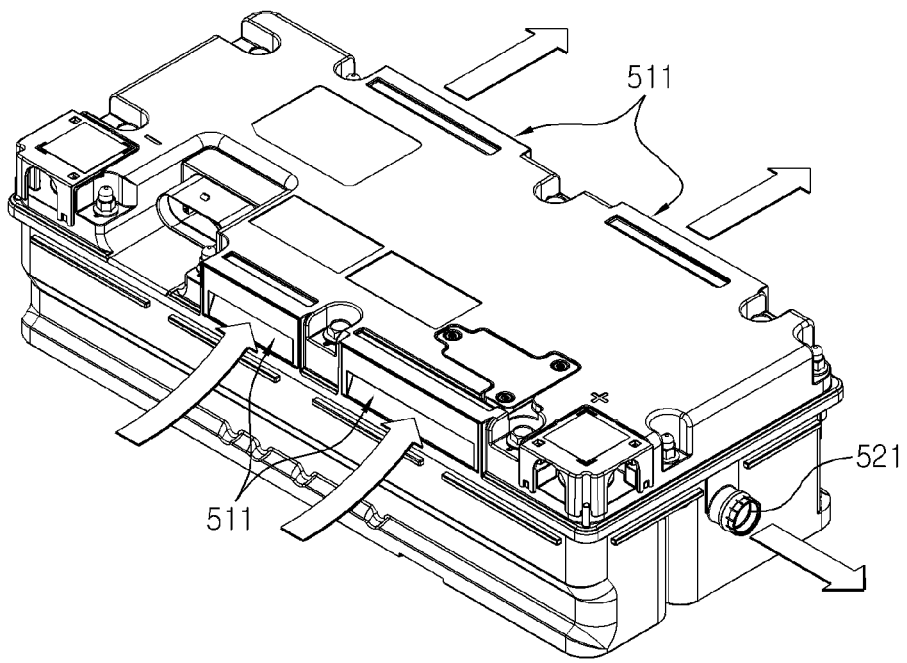
FIG. 12 is a view of inflow/exhaust directions of cooling fluid and an exhaust direction of a venting gas in a secondary battery pack according to an embodiment of the present disclosure.

Meanwhile, as described above, in the secondary battery pack according to the present disclosure, paths respectively of cooling fluid and a venting gas have completely separated structures such that the cooling fluid is not mixed with the venting gas. Referring to FIG. 12, flow of the cooling fluid and flow of the venting gas are illustrated. That is, the cooling fluid flows in and out through the ventilation hole 511 provided to a long side of the upper case 510, and the venting gas is discharged in a direction perpendicular to the flow of the cooling fluid through a gas exhaust hole 521 provided to a short side of the lower case 520.

In the battery pack according to the present disclosure, the cooling channel P and a channel of a venting gas respectively have completely separated structures such that the cooling fluid is not mixed with the venting gas. Therefore, in the case where the battery pack according to the present disclosure is applied as a battery pack for an automobile, occurrence of a phenomenon that the venting gas flows into an air conditioning system may be prevented.

Also, an automobile to which the battery pack according to the present disclosure is applied may be designed such that a venting gas is discharged to the outside of the automobile or the venting gas is converted to an unharmful gas through a gas processor installed inside the automobile and discharged by including a path connected to the gas exhaust hole 521 of the battery pack separately from an air conditioning system.

As described above, the automobile according to the present disclosure may include a secondary battery pack according to the present disclosure. The secondary battery pack is applicable to not only an automobile such as an electric automobile or a hybrid automobile but also IT products.

Although the preferred embodiments of the present disclosure have been illustrated and described, the present disclosure is not limited thereto and it should be understood by those of ordinary skill in the art that various modifications may be made within the scope of claims without departing from concept of the disclosure.

Meanwhile, it is obvious to those of ordinary skill in the art that in the case where terms representing directions such as up, down, left, and right are used in the present specification, these terms represent a relative position and are used for convenience of description only, and may change depending on a location of an object or a location of an observer.

What is claimed is:

1. A cartridge for a secondary battery, the cartridge comprising a cooling channel in which an upper cooling plate and a lower cooling plate are respectively coupled to an upper rim and a lower rim of a ring-shaped main frame and having a hollow central area and face each other, the cooling channel being formed in a space between the upper cooling plate and the lower cooling plate,
   wherein the main frame comprises an opening configured to form an inlet and an outlet of the cooling channel by passing through the main frame in a lateral direction, the opening having an edge area chamfered such that a diameter thereof expands in an outward direction,
   wherein the upper cooling plate and the lower cooling plate are air-tightly bonded to the main frame with an adhesive disposed between a rim portion of the upper cooling plate and an upper end rim of the main frame and between a rim portion of the lower cooling plate and a lower end rim of the main frame,
   wherein the rim portion of the upper cooling plate is air-tightly bonded by the adhesive to an outer periphery of the upper end rim of the main frame and the rim portion of the lower cooling plate is air-tightly bonded by the adhesive to an outer periphery of the lower end rim of the main frame, and
   wherein the outer periphery of the upper end rim of the main frame and the outer periphery of the lower end rim of the main frame are extended in the lateral direction toward the hollow central area.

2. The cartridge of claim 1, wherein the opening comprises a first section having a diameter corresponding to the cooling channel and a second section having a diameter increasing from an end point of the first section.

3. The cartridge of claim 2, wherein the opening further comprises a third section having a diameter discontinuously increasing from an end point of the second section.

4. The cartridge of claim 3, wherein a diameter of an end point of the third section is equal to or greater than a diameter of the second section when the second section is further extended to the end point of the third section.

5. The cartridge of claim 1, wherein the main frame comprises four unit frames forming a rectangular structure, and the opening is formed in a pair of unit frames corresponding to a long side of the main frame.

6. The cartridge of claim 5, further comprising:
   a spacer member comprising one end and an opposite end, the one end being fixed to an opening of one of the pair of unit frames, the opposite end being fixed to an opening of the other, the spacer member crossing a central area of the main frame.

7. The cartridge of claim 1, further comprising a coupling protrusion protruding on or under the main frame in a vertical direction, and a coupling groove recessed in an opposite side to a side to which the coupling protrusion is provided.

8. A secondary battery pack comprising:
   a cell assembly in which cartridges for the secondary battery of claim 1 respectively receive secondary batteries and are arranged in a layered form;
   a duct unit comprising a cover mounted on the cell assembly and configured to form an air flow space and cover at least one of an entry and an exit of the cooling channels, and an air inlet/outlet provided to an upper end of the cover; and
   a pack case configured to receive the cell assembly and the duct unit as one body, and comprising a ventilation hole configured to communicate with the air outlet.

9. The secondary battery pack of claim 8, wherein the duct unit comprises an inlet duct and an outlet duct configured to respectively cover the entry and the exit of the cooling channels.

10. The secondary battery pack of claim 9, further comprising:
    a fan provided to the cover of the outlet duct such that air flows through the cooling channels.

11. The secondary battery pack of claim 8, wherein the cover is configured such that the air flow space is reduced from an upper end thereof to a lower end thereof.

12. An automobile comprising the secondary battery pack of claim 8.

13. The cartridge of claim 1, wherein a distance between inner peripheries of the upper and lower end rims of the main frame is less than a distance between the rim portions of the upper and lower cooling plates so that the upper and lower end rims of the main frame are interposed between the rim portions of the upper and lower cooling plates.

* * * * *